United States Patent [19]
Fava et al.

[11] Patent Number: 5,473,871
[45] Date of Patent: Dec. 12, 1995

[54] MACHINE FOR CUTTING GRASS AND THE LIKE WITH FRONT ACTION AND CENTRAL STORAGE CONTAINER BETWEEN THE FRONT AND REAR WHEELS

[75] Inventors: Nedo Fava; Claudio Ferrari, both of Gonzaga, Italy

[73] Assignee: Officine Bieffebi S.R.L., Italy

[21] Appl. No.: 221,382

[22] Filed: Mar. 30, 1994

[30] Foreign Application Priority Data

Apr. 7, 1993 [IT] Italy .................. RE93A0032

[51] Int. Cl.⁶ ............................................. A01D 34/64
[52] U.S. Cl. .................... 56/14.7; 56/16.6; 56/203
[58] Field of Search .................... 56/14.7, 15.7, 56/15.8, 16.6, 202, 203, DIG. 10

[56] References Cited

U.S. PATENT DOCUMENTS

| | | | |
|---|---|---|---|
| 3,908,398 | 9/1975 | Braunberger | 56/15.7 X |
| 3,969,876 | 7/1976 | Turos | 56/202 |
| 4,151,702 | 5/1979 | Brown | 56/203 |
| 4,335,567 | 6/1982 | Comer | 56/12.7 |
| 4,589,249 | 5/1986 | Walker et al. | 56/16.6 |
| 4,709,541 | 12/1987 | Broman et al. | 56/202 |
| 4,777,786 | 10/1988 | Arnold | 56/202 X |
| 4,835,951 | 6/1989 | Walker | 56/16.6 |
| 4,899,525 | 2/1990 | Takei et al. | 56/202 |
| 4,974,403 | 12/1990 | Fukuiet et al. | 56/202 |

FOREIGN PATENT DOCUMENTS

| | | |
|---|---|---|
| 0122903 | 10/1984 | European Pat. Off. . |
| 0254657 | 1/1988 | European Pat. Off. . |
| 0255459 | 2/1988 | European Pat. Off. . |
| 0468362 | 1/1992 | European Pat. Off. . |
| 0532068 | 3/1993 | European Pat. Off. . |
| 2578380 | 9/1986 | France . |
| 2681216 | 3/1993 | France . |

*Primary Examiner*—George A. Suchfield
*Attorney, Agent, or Firm*—Ladas & Parry

[57] ABSTRACT

A machine for cutting grass and the like of the type comprising a frame (1a) to which are made integral an operating engine (2), a driving seat (3), means (4) for steering the machine and a front grass-cutting plate (60), characterized in that such grass-cutting plate (60) comprises at least one or more pairs of cutting blades (61) made to rotate via means (2a, 63, 66, 67, 61a) of transmission of the drive from engine (2) and a guard (62) for protecting such cutting blades, which is extended toward the middle part of the machine by a duct (63) capable of engaging a cut-grass collecting container (9) located centrally with respect to the axes of rotation of front wheels (7) and rear wheel (8) of the machine and located in the lower position grazing the ground as shown in FIG. 3, the action of pushing the cut grass toward such container being exerted by the pressure generated by the rotation of cutting blades (61).

6 Claims, 3 Drawing Sheets

MACHINE FOR CUTTING GRASS AND THE LIKE WITH FRONT ACTION AND CENTRAL STORAGE CONTAINER BETWEEN THE FRONT AND REAR WHEELS

The object of this invention is a machine for cutting grass and the like comprising a front grass-cutting plate connected to a cut-grass collecting container located centrally with respect to the axes of rotation of the front and rear wheels of the machine, the action of pushing the cut grass toward such container being exerted by the pressure generated by the rotation of the cutters.

BACKGROUND OF THE INVENTION

There are known in engineering numerous types of self-propelled devices for cutting the grass of both small and large lawns.

Such known devices, however, display numerous disadvantages associated with their general design which provides for cutting only, without recovery of the cut grass, the latter being simply ejected sideways from the mower making subsequent gathering necessary, or else cutting and recovery of the cut grass is carried out using ancillary means such as turbines and the like which make oversizing necessary either because of the overall dimensions of the device or because of the motive power to be used. There is therefore posed the technical problem of providing a self-propelled device capable of cutting the grass in the forward position and at the same time collecting the cut grass without the need for ancillary components which increase the overall dimensions and power consumption.

Such device should furthermore ensure high maneuverability with suitable edge guides for high cutting accuracy and should be equipped with means for transmission of movement capable of also allowing control of the cutting height and adaptation of the cutting plate to the unevenness of the ground.

Within the context of such problem, a further technical requirement is the ability to obtain ease of access to the mechanical parts for normal ordinary and extraordinary maintenance operations without it being necessary to use auxiliary equipment such as jacks and the like.

SUMMARY OF THE INVENTION

Such results are obtained with the present invention, which provides a machine for cutting grass and the like of the type comprising a frame to which are made integral an operating engine, a driving seat, means for steering the machine and a front grass-cutting plate, in Which such grass-cutting plate comprises at least one pair of cutters made to rotate via means of transmission of the drive from the engine and a guard for covering and protecting such cutters which is extended toward the middle part of the machine by a duct capable of engaging a cut-grass collecting container located centrally with respect to the axes of rotation of the front and rear wheels of the machine, the action of pushing the cut grass toward such container being exerted by the pressure generated by the rotation of the cutters.

According to a preferred form of implementation, such means of transmission of the drive from the engine to the cutters comprise at least one pair of universal joints consisting respectively of two tubular members telescopically connected to one another, capable of allowing shifting parallel to itself of the horizontal cutting plane of the cutters.

Provision is also made for such container to have an opening capable of engaging the end of such duct of the grass-cutting plate guard and for such container to be made integral with the frame via means of connection capable of allowing lateral movement of the container out of the machine as well as its rotation around a horizontal axis to bring about tipping thereof and therefore ejection of the cut grass.

BRIEF DESCRIPTION OF DRAWINGS

Further details may be obtained from the following description with reference to the attached drawings, which show.

DETAILED DESCRIPTION OF THE INVENTION

Figure 1:
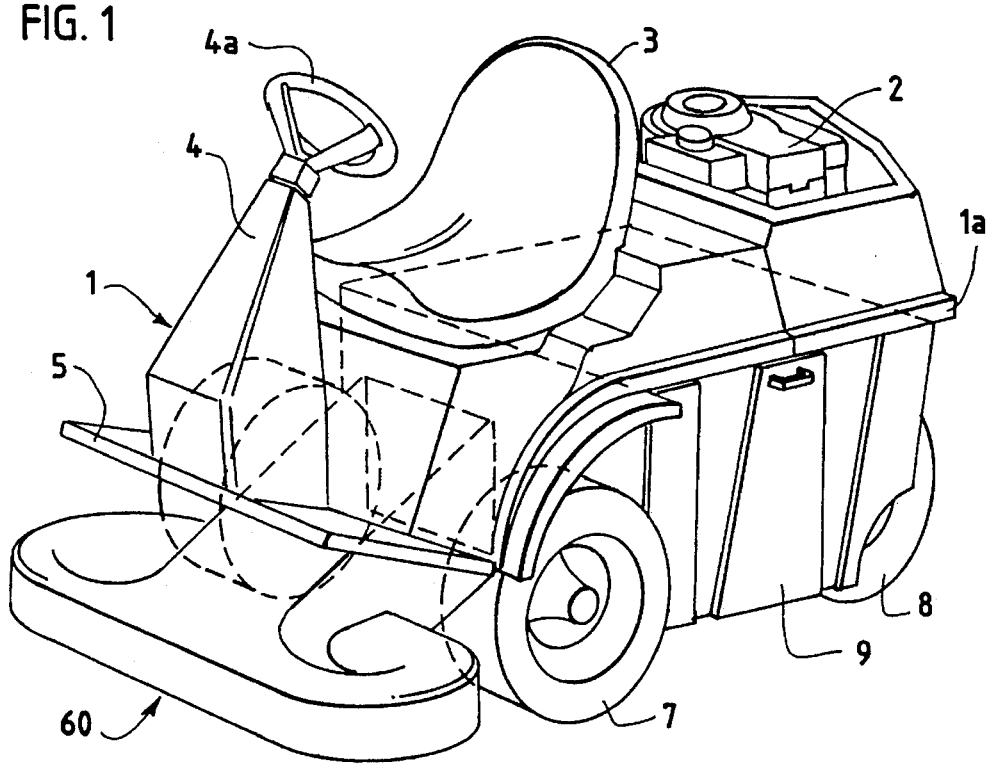
in FIG. 1: a perspective view of the grass-cutting machine according to the invention.
Figure 2:
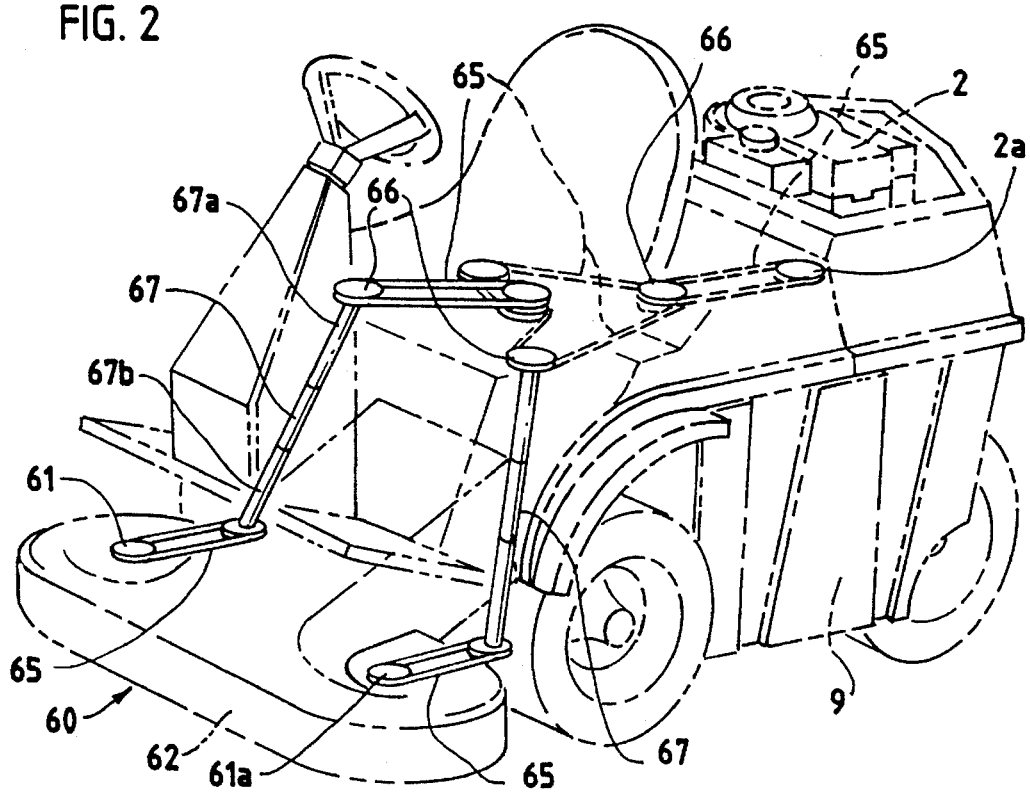
In FIG. 2: a schematic view of the machine in FIG. 1 with a diagram of the transmission of the drive to the cutting blades.

As shown in FIG. 1, grass-cutting machine I according to the invention consists of a frame 1a to which are made integral operating engine 2 located in an elevated position at the rear, driving seat 3 located in a substantially central elevated position, steering system 4 located in the forward position, footrest 5 for supporting the feet of the operator and cutting plate 60 located in the forward position at ground level.

Figure 3:
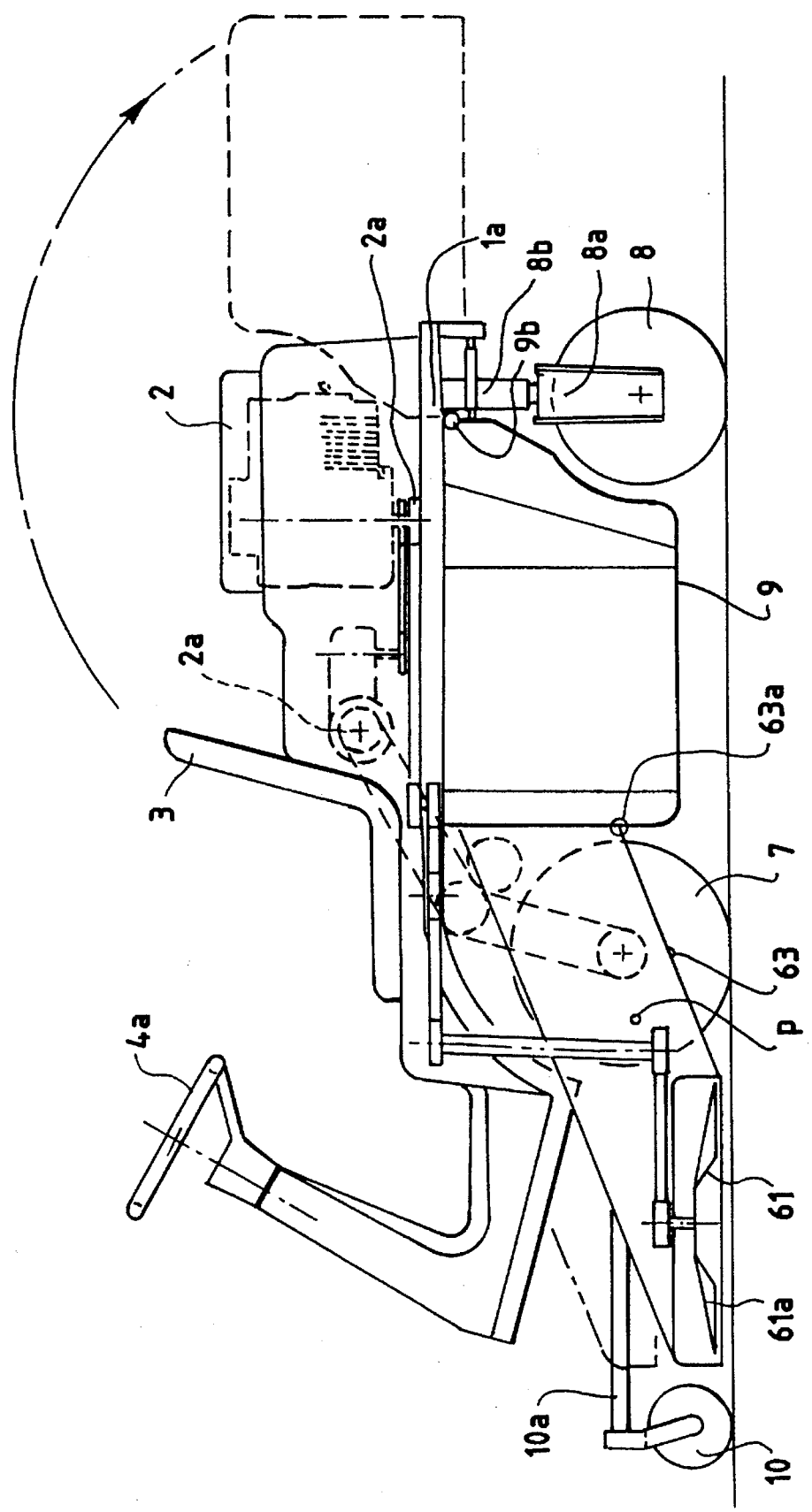
In FIG. 3: a partial longitudinal schematic section of the machine in FIG. 1.

Engine 2 is linked by the driving system to front wheels 7 via means of transmission which are self-evident and therefore only shown schematically at 2a in FIG. 3 and not described in detail.

The single, rear idle-wheel 8 is instead made integral with frame 1a by fork 8a which is capable of being rotated by pivot 8b operated via self-evident means of transmission by steering wheel 4a.

Grass-cutting plate 60 essentially consists of a pair of cutters 61 with cutting blades 61a located parallel to the ground and protected from impacts and the like by a guard 62 which extends upward toward the middle part of machine 1 with a duct 63, the upper part of end 63 of which, opposite to plate 60, is capable of being inserted into a corresponding seat 9a of a cut-grass collecting box 9 located in an intermediate position between front wheels 7 and rear wheel 8 and below frame 1a, while the lower part of the same end of the duct is made integral with box 9 by means of a horizontal axis hinge 63a.

Figure 4:
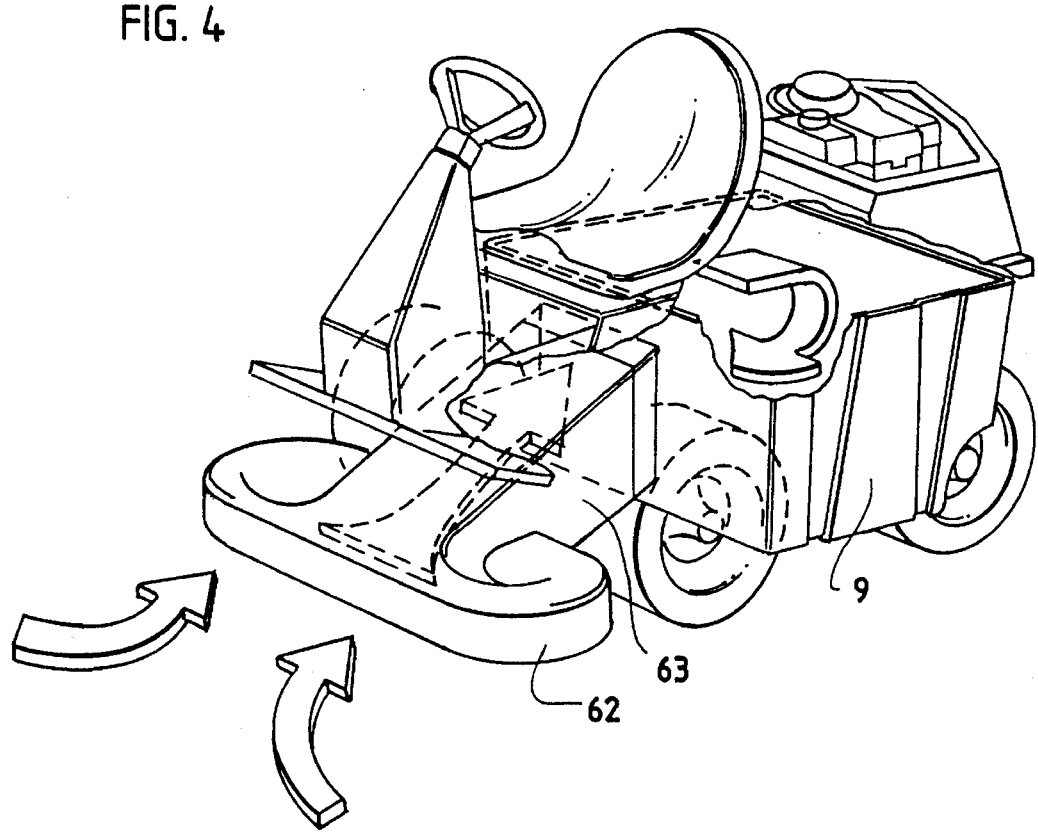
In FIG. 4: the flow diagram of collection of the cut grass.

The transmission of movement to cutters 61 is effected via a gearwheel 2a operated by engine 2 and connected to drive shafts 61a of cutters 61 via a kinematic chain consisting of toothed belts 65 and return idle-wheels 66 connected by means of a pair of universal joints 67 capable of transmitting the drive to cutters 61 regardless of the tilt assumed by cutting plate 60 in relation to the change of slope of the ground. Since, however, the cutting plate should shift its own cutting plane parallel to itself, such universal joints 67 comprise two tubular members 67a and 67b joined together telescopically in order to allow for the change of slope of the cutting plate in relation to the unevenness of the ground, such change being determined by a, wheel 10 projecting forward of guard 62 and linked to it by means of a rigid member 10a as illustrated in FIG. 3. When wheel 10 encounters an unevenness in the ground it causes the raising of cutting plate 60 which, due to the combined effect of the rotary movement around hinge 63a and the relative movement of tubular components 67a and 67b of universal joint 67, performs a substantially rectilinear raising and lowering movement. The rotary movement of cutters 61, in addition to bringing about cutting of the grass, generates air pressure in the direction of collecting box 9 as shown by the arrow in FIG. 4, (part of seat 3 and frame 1a above the box 9 are removed for clear illustration of the cut grass flow) so that the cut grass is sucked in and blown through duct 63 into box 9.

Figure 5:
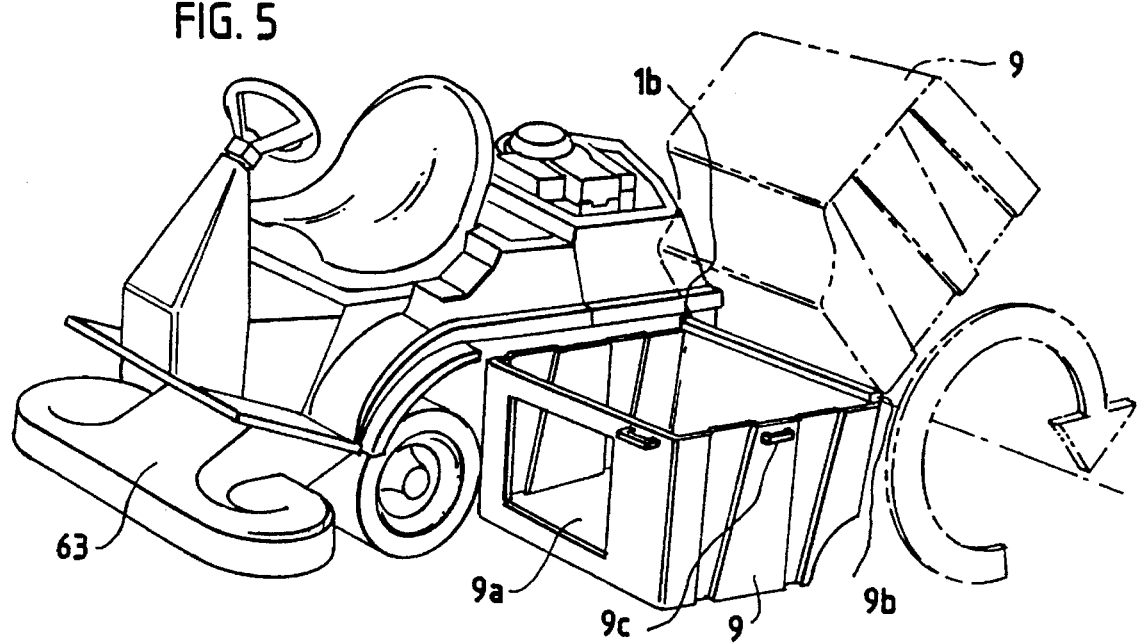
In FIG. 5: the cut-grass collecting device withdrawn for emptying.

Such box 9 is made integral with frame 1a by means of a hinge 9b which extends across the width of box 9 and is capable of sliding on a guide 1b of frame 1, thus making it possible to withdraw box 9 by pulling appropriate handle 9c; once box 9 is fully withdrawn it remains linked in cantilever to the frame by means of hinge 9b around which it may be made to rotate so as to empty it as shown in dotted outline in FIG. 5. Many variants may be introduced without thereby departing from the scope of the invention in regard to its general features.

We claim:

1. A machine for cutting grass, comprising a frame to which are connected an operating engine, a driving seat, means for steering the machine and a front grass-cutting plate, said grass-cutting plate including at least one pair of cutters and a guard for protecting said cutters which is extended toward the middle part of the machine by a duct, said duct capable of engaging a cut-grass collecting container located centrally with respect to the axes of rotation of front wheels and rear wheels of the machine, and means for transmitting the drive from said engine to rotate said pair of cutters, said transmitting means including at least a pair of universal joints consisting respectively of two tubular members telescopically connected to one another and capable of allowing shifting parallel to itself of a horizontal cutting plane of said cutters, the rotation of said cutters generating and exerting a pressure on cut grass thereby pushing the cut grass toward said container.

2. The machine of claim 1, wherein said container has an opening capable of engaging the end of said duct of the guard of the grass-cutting plate.

3. The machine of claim 1, wherein said container is made integral with said frame through connection means which is capable of allowing lateral movement of the container out of the machine and its rotation around a horizontal axis to bring about tipping thereof and therefore ejection of the cut grass.

4. The machine of claim 3, wherein said connection means substantially consist of a hinge capable of sliding on guides integral with said frame.

5. The machine of claim 1, wherein said duct is made integral with said container by means of at least one hinge of substantially horizontal axis to enable said cutting plate to adapt to any uneven ground.

6. The machine of claim 1, wherein the rotation of said cutters provides the pressure needed to blow the cut grass into said container through the duct.

\* \* \* \* \*

UNITED STATES PATENT AND TRADEMARK OFFICE
CERTIFICATE OF CORRECTION

PATENT NO. : 5,473,871
DATED : December 12, 1995
INVENTOR(S) : Nedo FAVA et al

It is certified that error appears in the above—identified patent and that said Letters Patent is hereby corrected as shown below:

Column 2, line 31, change "machine I" to --machine 1--
Column 2, line 52, after "end" delete "63"

Signed and Sealed this

Twenty-ninth Day of October 1996

Attest:

BRUCE LEHMAN

Attesting Officer

Commissioner of Patents and Trademarks